United States Patent [19]

Wagers et al.

[11] Patent Number: 4,923,551
[45] Date of Patent: May 8, 1990

[54] METHOD FOR THE PRODUCTION OF COMPOSITE PLASTIC FILM

[75] Inventors: Kevin J. Wagers; Douglas P. Gundlach, both of Midland, Mich.

[73] Assignee: The Dow Chemical Company, Midland, Mich.

[21] Appl. No.: 164,705

[22] Filed: Mar. 7, 1988

[51] Int. Cl.⁵ .............................................. B29C 47/04
[52] U.S. Cl. ........................... 156/244.11; 156/244.12; 156/244.25; 264/171; 264/177.1
[58] Field of Search ....................... 156/244.11, 244.12, 156/244.25; 264/171, 177 R, 245, 246; 425/131.1, 133.5

[56] References Cited

U.S. PATENT DOCUMENTS

| | | | |
|---|---|---|---|
| 3,565,737 | 2/1971 | Lefevre et al. | 156/244.11 |
| 3,715,420 | 2/1973 | Kiyono et al. | 264/171 |
| 3,773,882 | 11/1973 | Schrenk | 264/171 |
| 3,847,585 | 11/1974 | Chisholm | 65/99 |
| 4,185,951 | 1/1980 | Webermeier et al. | 425/133.5 |
| 4,327,009 | 4/1982 | Allen et al. | 524/114 |
| 4,379,806 | 4/1983 | Korpman | 428/354 |
| 4,518,654 | 5/1985 | Eichbauer et al. | 428/331 |
| 4,533,509 | 8/1985 | Gust et al. | 264/171 |
| 4,552,521 | 11/1985 | Linnstaedter | 425/131.1 |
| 4,556,376 | 12/1985 | Sievers et al. | 425/133.5 |

FOREIGN PATENT DOCUMENTS 144145 11/1981 Japan ................................. 264/171

*Primary Examiner*—Caleb Weston

[57] ABSTRACT

A method and apparatus for producing a plastic film having strips of an adhering material embedded in each surface of the film, which film may have an anti-block agent incorporated therein, and a composite plastic film so produced is provided which includes initially providing a first stream of heat plastified extrudable thermoplastic film material to a cast film die. The cast film die has two opposing die lips with each die lip having a plurality of spaced strip channels. The strip channels of one die lip are laterally offset from the strip channels of the second die lip. A heat plastified extrudable adhering material is introduced into the plastified film material from the strip channels and then the composite body of materials is forced from the die lips of the cast film die and cooled to form the plastic film.

10 Claims, 2 Drawing Sheets

METHOD FOR THE PRODUCTION OF COMPOSITE PLASTIC FILM

BACKGROUND OF THE INVENTION

This invention relates to the production of extruded plastic film. More particularly, the invention relates to extruded plastic film with strips of an adhering material embedded in each surface of the film and a method and apparatus for producing such a composite plastic film.

Plastic films are widely used in commercial and home environments for enclosing various articles. The individual consumer, in particular, extensively uses plastic films for wrapping food items. The plastic film is conventionally wound on a core and packaged in film lengths ranging up to several hundred feet. Individual lengths are dispensed and cut to need.

Many consumers feed that current plastic films can be improved upon in certain respects. For instance, it is common to wrap a food article such as a sandwich in plastic film and store it it an freezer. Most plastic films sold for this purpose inherently cling to themselves. Thus, wrapping the food article with the film and then merely overlapping one portion of the plastic film with another portion results in a wrapped article which stays together because of the plastic film's inherent cling characteristics. However, when the wrapped food article is stored in the freezer, the modulus of elasticity (stiffness) of the plastic film increases which tends to cause the film to straighten out and unwrap. In fact, it is not uncommon for the plastic film to become unwrapped while in the freezer.

Using plastic film with greater inherent cling is one obvious solution. However, the cling property must not be too great due to the fact the plastic film is wound on a core during production and must be easily unrolled by the consumer during a dispensing operation. Adhesive strips positioned on the film's surface have also been suggested for holding the wrapped plastic film together. The problem encountered with such strips is they give the plastic film a slightly raised surface which becomes exacerbated when the film is wound in several layers on a core.

There is disclosed in Lefevre et al., U.S. Pat. No. 3,565,737, assigned to the same assignee as the present invention, a composite film which has increased cling. the composite film has a body portion made from low cling plastic with strips of relatively high cling or adhesive material embedded in each major surface of the body portion. The disclosed plastic film is said to have the good wrap and dispensing properties of the main body plastic and the good adhesive properties of the strip material. An illustrated apparatus for producing the composite film uses two extruders. One extruder provides a plastified film forming thermoplastic material to a sheeting die. This material forms the main body of the composite film. A second extruder feeds the adhesive material in the form of strips into the plastified mass of main body material prior to the two materials being forced out through a die lip. A controlled operation of the disclosed apparatus is difficult because of inherent design limitations. Thus, strip width variance is a problem because of injection of the adhering material into the main body mass of plastified material. Processing flexibility with regard to strip width and strip lateral placement is also very limited. Yet another problem is that the film of Lefevre, which has increased cling, tends to block (stick to itself to such a degree that it is difficult to unroll it from a roll).

Accordingly, the need remains for a more economical and efficient method and apparatus for producing composite films wherein strips of adhering materials are strategically positioned during production of the plastic film and form an improved composite plastic film which has increased cling without undue blocking tendencies.

SUMMARY OF THE INVENTION

That need is met by the present invention which provides an improved composite plastic film and an efficient method and apparatus for producing that film.

The method of the present invention is capable of economically and efficiently producing a plastic film with strips of an adhering material in each surface of the film. The preferred method comprises providing a first stream of heat plastified extrudable thermoplastic film material to a cast film die having two opposing die lips, each die lip having a plurality of strip channels laterally disposed and each set of strip channels offset from the set in the opposing die lip, introducing a heat plastified adhering material into the film material from the strip channels to form a composite body of materials, and extruding the composite body of materials from the cast film die to form the plastic film.

The present invention also involves apparatus useful for producing plastic film with strips of an adhering material. The preferred apparatus comprises a cast film die having two opposing die lips with each die lip having a plurality of strip channels laterally spaced and offset from one another, a main extruder source in fluid connection with the cast film die, an auxiliary extruder source in fluid connection with the strip channels in one die lip, an auxiliary extruder source in fluid connection with the strip channels in an opposing die lip, means for conveying a heat plastified extrudable (plastic film material to the cast film die, means for introducing an adhering material from the auxiliary extruder source into the film material through the strip channels to form a composite body a material through the lips of the cast film die to form the plastic film.

The method and apparatus of the present invention enable one to produce more easily and economically a composite plastic film having strips of an adhering material embedded in both surfaces of the film. The result is an improved consumer wrap which can be used in the freezer, refrigerator, and microwave oven because of the areas of increased cling. In addition, by using an anti-block agent, such as approximately 0.001–0.4% by weight silicon dioxide in the film material, it is possible further to improve the composite plastic film in terms of the ability of the composite plastic film to unroll from a wound roll without undue blocking.

Accordingly, it is an object of the present invention to provide an improved composite plastic film containing an anti-bloc agent and to provide a method and apparatus for producing a composite plastic film having strips of an adhering material embedded in both surfaces of the film,. Other objects and advantages of the invention will be apparent from the following description, the accompanying drawings and the appended claims.

DETAILED DESCRIPTION OF THE PREFERRED EMBODIMENTS

Figure 1:
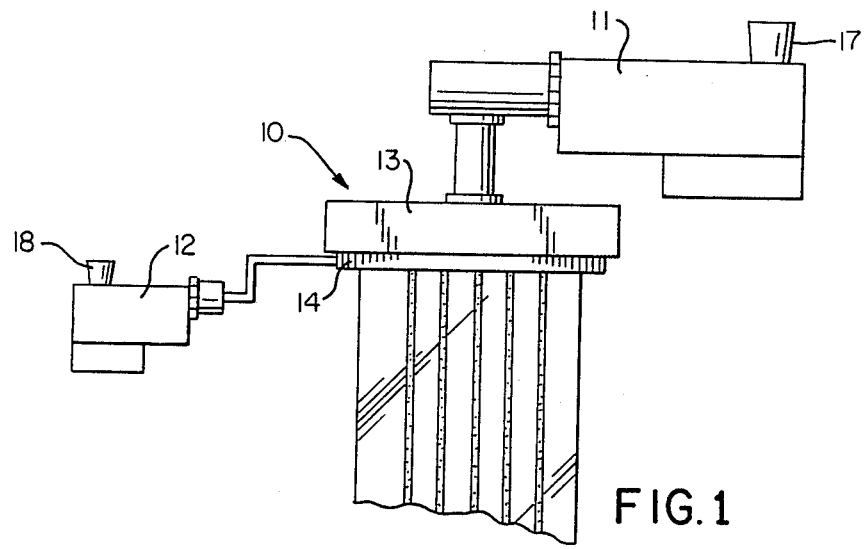
FIG. 1 is a front view of an extrusion apparatus for producing a plastic film with strip of adhering material embedded in each surface of the film.

The method and apparatus of this invention are described with particular reference to the drawings. in FIG. 1, an extrusion apparatus is illustrated generally as 10. The extrusion apparatus comprises a main extruder 11 and an auxiliary extruder 12. Both extruders are in fluid connection with a cast film die 13 to deliver heat plastified materials. The cast film die has an elongated slot orifice which causes the heat plastified material within the die to form into a thin sheet of material as it exits through the orifice. A pair of die lips 14 and 15 described in detail below are attached to the cast film die 13 on opposing sides of the die's elongated slot orifice.

A polymeric material which is fed into hopper 17 of the main extruder 11 is internally plastified as it moves through the extruder. A second material having greater adhering characteristics is fed into hopper 18 of extruder 12 and is plastified as it moves therethrough. The product which emerges from the die lips of the extruder is a sheet of plastic film 20 having a main body of the polymeric material and strips of the adhering material substantially embedded in each surface of the main body.

Figure 2:
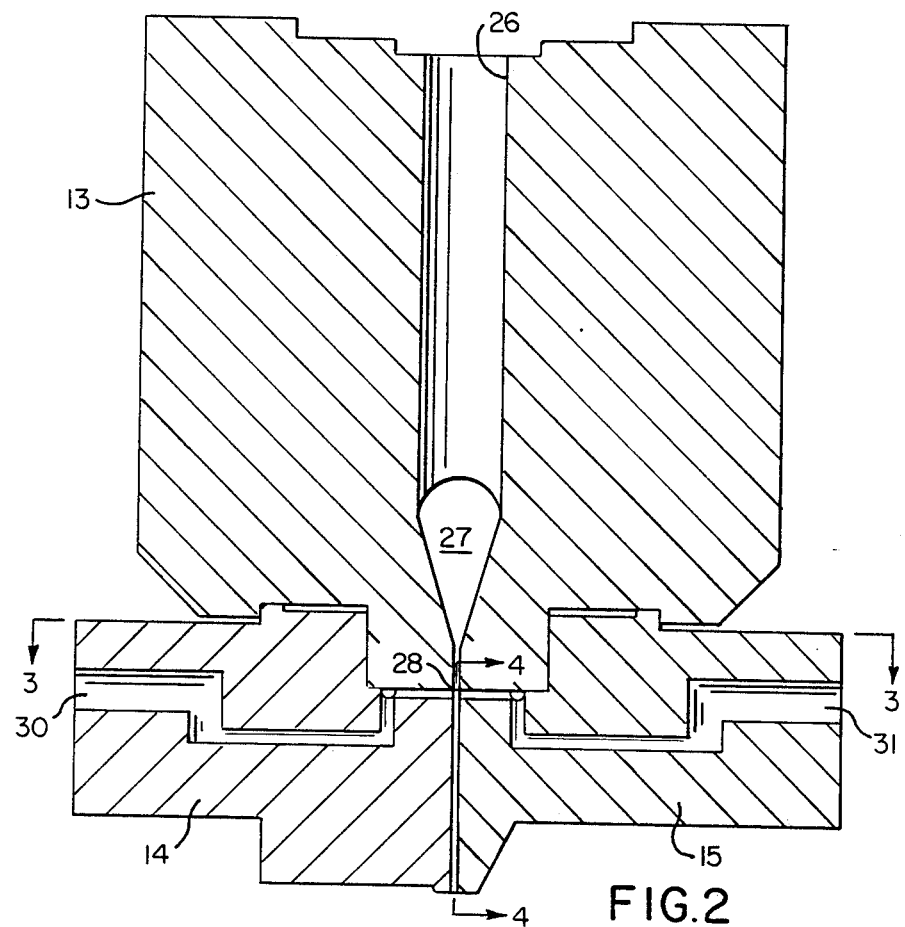
FIG. 2 is a side view in section of the die and die lips found on the apparatus of FIG. 1.
Figure 3:
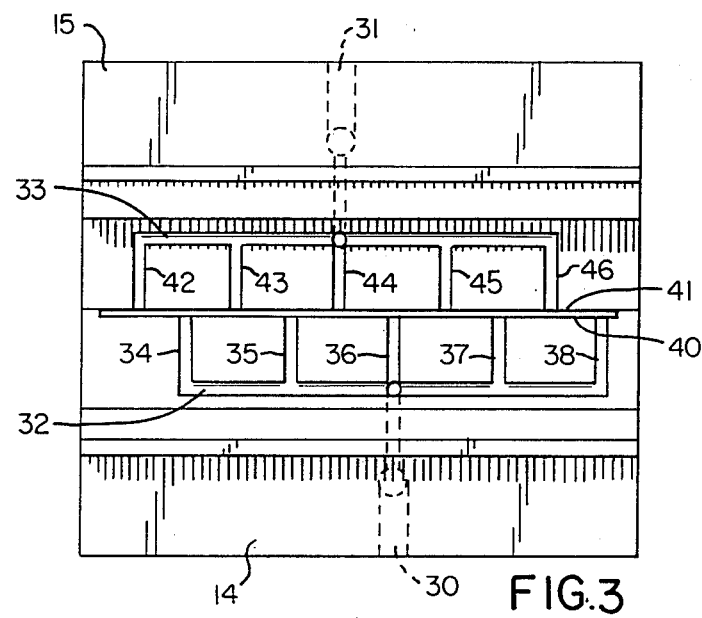
FIG. 3 is an end view of the die lips of the apparatus of FIG. 1 taken along lines 3—3 of FIG. 2.
Figure 4:
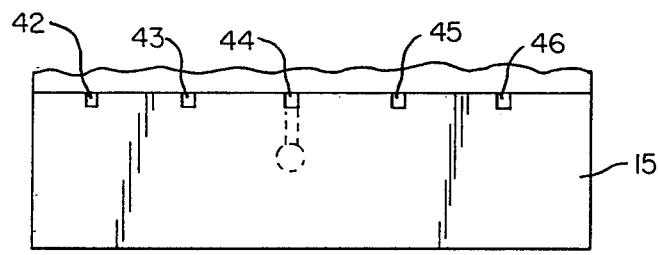
FIG. 4 is a top view of a die lip found on the die taken along lines 4—4 of FIG. 2.

FIGS. 2-4 are referred to for a more detailed description of the die and die lips found on the extrusion apparatus of FIG. 1. The cast film die 13 is in operative communication with a source of plastified extrudable thermoplastic film material through channel 26. The heat plastified material is forced through channel 26 typically by a single screw (not shown) to internal cavity 27. A continued flow of plastified material into cavity 27 creates a sufficient back pressure such that, at steady state, an even flow of the plastified material in a sheet form emerges at slot orifice 28.

The opposing die lips 14 and 15 are positioned on the cast film die 13 in operable association with the die's slot orifice. At least one of the die lips has adjusting means to control film thickness. Die lips 14 and 15 each receives a flow of a heat plastified extrudable adhering material through channels 30 and 31, respectively. As best seen in FIG. 3, wherein an end view of the die lips is depicted, elongated internal cavities 32 and 33 extending across each die lip initially receive the plastified adhering material. A set of substantially parallel strip channels 34, 35, 36, 37 and 38 extend from the cavity 32 of die lip 14 and an outer edge 40. Outer edge 40 of the die lip is positioned juxtaposed to the sheet of plasticized film material as it emerges from the slot orifice of the die. A corresponding set of substantially parallel strip channels 42-46 are found in die lip 15. This set of strip channels extends from cavity 33 of the die lip to an outer edge 41. Plastified adhering material flowing through the channels will flow into the plastified thermoplastic film flowing from extruder 11 and form substantially parallel strips along the length of the film.

As apparent from FIG. 3, the channels in the opposed die lips are laterally offset from each other. The amount of offset is sufficient so that when the produced plastic film is wound on a core prior to packaging, the strips on a back surface will not touch the strips on an adjoining front surface. Preferably, the channels are equidistant from adjoining channels. Additionally, it is preferred that each channel in a die lip is laterally offset approximately one-half the distance between strip channels in the opposing die lip. Generally, for most plastic films to be used in the household, each die lip has several channels so that the produced plastic film has strips of adhering material about one-half inch apart, on center, on each surface. For example, a twelve inch wide film would have approximately 24 channels on a side while a 72 inch wide film would have 144 channels on a side. This spacing may vary so long as there is no overlap of channels from one surface of the film to the other as the film is wound.

In accordance with general plastic film extrusion practice, a film is extruded at temperatures suited to the particular components which form the film. The temperature is optimally maintained at a temperature most suited for the major component of the film. The feed rate to the cast film die is maintained at its optimum speed. The temperature of the adhering materials during processing and their feed rates are maintained at levels sufficient to provide a film having a generally flat outer surface.

Resultant films from the method of the invention are typically wound on a one to three inch core until a total diameter of from about one inch to about four inches is obtained. The wound film has a cylindrical configuration with no significant distortion where the adhering strips are found.

In the practice of the present invention, a wide variety of synthetic resinous thermoplastic film-forming materials may be employed. The materials selected depend on the properties of the plastic film desired. Examples of suitable materials include polyethylene, polypropylene, polyvinyl chloride, polystyrene, extrudable condensation polymers such as the linear polymer obtained from the condensation produce hexamethylenediamine and adipic acid, polycaprolactam (Nylon 6), copolymers of vinyl chloride, other monomers such as vinyl acetate and vinyl chloride, other monomers such as vinyl acetate and ethyl acrylate, polymethylmethacrylate, polyethylmethacrylate, copolymers of methyl and methylmathacrylate, thermoplastic cellulosic materials including cellulose acetate, cellulose propionate, cellulose acetate-butyrate, and ethyl cellulose, chlorinated polyolefins such as chlorinated polyethylene, chlorinated polypropylene and thermoplastic polymers and copolymers of vinylidene chloride and other mono-olefinically unsaturated monomers copolymerizable therewith. Low density polyethylene resins are highly preferred for their overall good set of film properties.

A wide variety of adhering materials to increase cling of the plastic film are utilized in the practice of the present invention. The adhering materials have adhesion characteristics substantially different from the resins used to make the film. Specifically, when coextruded with the film, the adhering materials form a permanent bond with the film. Further, the adhering materials are capable of adhering to a like adhering material to to form a tack bond and give the plastic film proper cling characteristics, but do not appreciably adhere to the film material itself. The resins from which such adhering materials are prepared include such materials as copolymers of ethylene and vinyl acetate including those containing from about 80 to about 10 weight percent ethylene and from about 20 to about 90 percent vinyl acetate. Thus, coextrusion of a copolymer of ethylene and vinyl acetate with a polyethylene resin forms permanent bonds between the two. Wrapping the film so that strips of the ethylene/vinyl acetate copolymer touch each other forms a tack bond which gives the film its cling characteristics.

Other polymer resins which may be suitable for use in the present invention include chlorinated polyethylene, highly plasticized polymers of vinyl chloride containing form about 30 to 60 weight percent of a suitable plasticizer such as tricresyl phosphate, certain copolymers of vinyl and vinylidene chloride which exhibit the characteristic of cling such as a copolymer of about 85 weight percent vinylidene chloride and about 15 weight percent vinyl chloride, uncured natural rubber, a copolymer of 50 percent styrene and 50 percent isobutyl acrylate as well as substantially solvent free pressure sensitive adhesives. Such adhesives are well known. The copolymers of ethylene and vinyl acetate (EVA) are preferred for use with the preferred film-forming material, i.e., low density polyethylene.

Optional components can be included in the film material or adhering strip material for processing or product performance reasons. For example, an antiblock agent such as silicon dioxide ($SiO_2$) can be included in the film material prior to plasticizing and extrusion. With the preferred polyethylene film material, a preferred range of $SiO_2$ content is 0 to 0.4 percent by weight. Use of an anti-block agent in the film material increases the adherence differential between the strips of adhering material embedded in the film and the film itself. In addition, use of an anti-block agent in the film makes it easier to unroll the film from a wound roll.

The preferred embodiment incorporation of an $SiO_2$ anti-block agent into the polyethylene film tends to decrease the blocking of the EVA strips of adhering material to the polyethylene film making the wrap easier to unroll, and reduces only somewhat the cling achieved by EVA to EVA adhesion, when the wrap is used on food products. It is believed that the addition of an anti-block agent to conventional wraps would permanently reduce the cling characteristics of the wrap and render it unsuitable for use. Thus, the composite film of the present invention is believed to be unique in its ability to have an anti-block agent incoporated therein.

Figure 5:
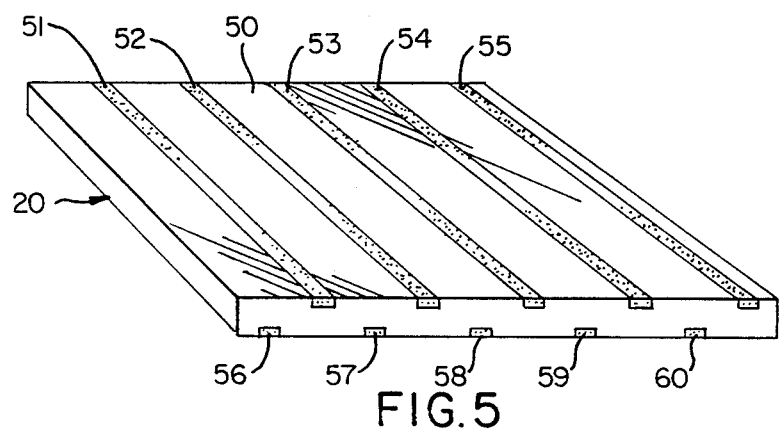
FIG. 5 is a perspective view of a section of plastic film produced in accordance with this invention.

With reference to FIG. 5, there is illustrated a section of plastic film produced by this invention. The plastic film 20 comprises a body portion 50 of the thermoplastic film material. Strips 51–55 found on the top major surface of the film body are composed of the adhering material. Strips 56–60 on the bottom major surface, also formed of the adhering material, are laterally offset from strips 51–55. The adhering strips are substantially co-planar with the film's surfaces. Additionally, the adhering strips embedded in each surface are substantially parallel and equidistantly spaced from one another. Such a configuration better ensures that when a food article is wrapped with the plastic film that the adhering strips will criss-cross and hold to one another to retain the wrapped condition.

The invention has been described with particular reference to the drawings. It should be understood that obvious modifications can be made to the described invention. For example, each die lip can be fed from separate auxiliary extruders. This allows further product flexibility in that adhering strips on one major surface of the produced film can be different in composition from adhering strips on the other major surface. Different channel shapes can also be utilized to obtain different shaped strips in the plastic film. All such modifications are within the scope of the following claims.

What is claimed is:

1. A method for production of a composite plastic film having embedded in both surfaces of the film strips of an adhering material having adhesion characteristics substantially different from the film, comprising:
   (a) providing a first stream of heat plastified extrudable thermoplastic film material to cast film die having two opposing die lips, each die lip having at least 24 strip channels located therein, the strip channels in one die lip being offset laterally from the strip channels in the opposing die lip;
   (b) introducing a heat plastified extrudable adhering material into the film material from the plurality of strip channels in each opposing die lip to form a composite body of material and
   (c) extruding the composite body of materials through the die lips of the cast film die to form the plastic film such that strips of the adhering material are substantially embedded in both surfaces of the thermoplastic film in an alternating pattern.

2. The method of claim 1 wherein each die lip has from 24 to 144 channels, depending upon the width of the film material which is extruded.

3. The method of claim 2 wherein channels in each die lip are equidistant from adjoining channels.

4. The method of claim 3 wherein each channel in one die lip is laterally offset approximately one-half the distance between the strip channels in the opposing die lip.

5. The method of claim 1 wherein the thermoplastic film material is a low density polyethylene.

6. The method of claim 5 wherein the adhering material used to form the strips is a copolymer of ethylene and vinyl acetate.

7. The method of claim 6 further wherein a silicon dioxide anti-block agent is incorporated into the thermoplastic film material prior to being plastified and extruded.

8. The method of claim 1 wherein the separate sources of adhering material are fed to the opposing die lips.

9. The method of claim 8 wherein the heat plastified extrudable thermoplastic film material is in a sheet form within the cast film die when the adhering material from the strip channels is introduced therein.

10. The method of claim 1 wherein the adhering material is introduced into the film material so that the strips of adhering material in the plastic film are substantially co-planar with the major surfaces of the film.

* * * * *

UNITED STATES PATENT AND TRADEMARK OFFICE
CERTIFICATE OF CORRECTION

PATENT NO. : 4,923,551

DATED : May 8, 1990

INVENTOR(S) : Kevin J. Wagers; Douglas P. Gundlach

It is certified that error appears in the above-identified patent and that said Letters Patent is hereby corrected as shown below:

Column 1, line 19, "feed" should correctly appear as --feel--.

Column 1, line 48, "the" should correctly appear as --The--.

Column 2, line 38, "(plastic" should correctly appear as --thermoplastic--.

Column 2, line 41, "a" should correctly appear --of--.

Column 2, line 41, "material" should correctly appear --materials,--.

Column 2, line 41, following "materials" insert --and means for extruding the composite body of material--.

Column 2, line 66, "strip" should correctly appear --strips--.

Signed and Sealed this

Thirty-first Day of December, 1991

*Attest:*

HARRY F. MANBECK, JR.

*Attesting Officer*     *Commissioner of Patents and Trademarks*